United States Patent
Quaglia et al.

(10) Patent No.: US 10,829,313 B2
(45) Date of Patent: Nov. 10, 2020

(54) GOODS TO OPERATOR WORKSTATION

(71) Applicant: INTELLIGRATED HEADQUARTERS, LLC, Mason, OH (US)

(72) Inventors: Christopher Quaglia, Randallstown, MD (US); Darius Scott, Baltimore, MD (US); Joseph Joice, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/053,280

(22) Filed: Aug. 2, 2018

(65) Prior Publication Data
US 2020/0039758 A1   Feb. 6, 2020

(51) Int. Cl.
*B65G 47/64*   (2006.01)
*B65G 47/57*   (2006.01)
*B65G 13/02*   (2006.01)

(52) U.S. Cl.
CPC ............. *B65G 47/57* (2013.01); *B65G 13/02* (2013.01); *B65G 2201/0235* (2013.01)

(58) Field of Classification Search
CPC ................ B65G 47/647; B65G 1/1378; B65G 2201/0235; B65G 47/57
USPC ... 198/603, 592, 463.3, 468.8, 345.3, 346.3, 198/586; 414/697
See application file for complete search history.

(56) References Cited

U.S. PATENT DOCUMENTS

| 2,639,800 | A | * | 5/1953 | Atwood | A21B 5/00 198/592 |
| 4,599,035 | A | * | 7/1986 | Goodlad | B66F 19/00 414/697 |
| 4,909,697 | A | * | 3/1990 | Bernard, II | B65G 1/0485 187/255 |
| 5,211,702 | A | * | 5/1993 | Tanaka | B65G 1/0407 414/404 |

(Continued)

FOREIGN PATENT DOCUMENTS

| CN | 208882924 U | 5/2019 |
| DE | 10259594 B3 | 4/2004 |

(Continued)

OTHER PUBLICATIONS

Combined Search and Examination Report for GB Application No. 1910818.2 dated Dec. 17, 2019, 6 pages.

*Primary Examiner* — Joseph A Dillon, Jr.
(74) *Attorney, Agent, or Firm* — Alston & Bird LLP

(57) ABSTRACT

The present disclosure relates to a goods to operator workstation for presenting a container of articles to an operator for picking. The goods to operator workstation includes a container presenting mechanism having laterally movable arms positioned at a first predetermined distance from each other to create a first space to receive and present the container to the operator for picking. A lifting unit moves vertically upwards into the first space to receive the picked container, the laterally movable arms move outwardly away from each other to be positioned at a second predetermined distance from each other, and the lifting unit moves vertically downwards through the at least two laterally movable arms to transfer the picked container onto the discharge conveyor.

20 Claims, 9 Drawing Sheets

(56) References Cited

U.S. PATENT DOCUMENTS

| | | | | |
|---|---|---|---|---|
| 5,513,936 | A * | 5/1996 | Dean | B65G 1/08 |
| | | | | 414/273 |
| 5,692,593 | A * | 12/1997 | Ueno | B23Q 7/03 |
| | | | | 198/369.2 |
| 6,390,278 | B1 * | 5/2002 | Brown | B65G 47/647 |
| | | | | 193/35 SS |
| 7,553,118 | B1 * | 6/2009 | Doepker | B65G 1/08 |
| | | | | 198/347.2 |
| 7,837,023 | B2 * | 11/2010 | Franzaroli | B65G 47/57 |
| | | | | 198/415 |
| 8,713,899 | B2 | 5/2014 | Hortig | |
| 9,026,243 | B2 | 5/2015 | Radwallner | |
| 9,266,675 | B2 * | 2/2016 | Yamashita | B65G 1/0492 |
| 10,150,626 | B2 * | 12/2018 | Eisenberg | B65G 47/643 |
| 10,167,145 | B2 * | 1/2019 | Spaulding | B65G 1/1378 |
| 2002/0104736 | A1 * | 8/2002 | Peppel | B65G 47/647 |
| | | | | 198/369.2 |
| 2011/0203231 | A1 * | 8/2011 | Hortig | B65B 67/02 |
| | | | | 53/473 |
| 2014/0249666 | A1 * | 9/2014 | Radwallner | B65G 1/1378 |
| | | | | 700/216 |
| 2016/0229633 | A1 | 8/2016 | Yamashita | |
| 2017/0362039 | A1 * | 12/2017 | Eisenberg | B65G 47/643 |
| 2018/0346254 | A1 * | 12/2018 | Hatanaka | B65G 47/57 |
| 2020/0122935 | A1 * | 4/2020 | Itoh | B65G 47/52 |

FOREIGN PATENT DOCUMENTS

| | | | |
|---|---|---|---|
| EP | 0244050 | A1 | 11/1987 |
| EP | 2141095 | A1 | 1/2010 |

* cited by examiner

GOODS TO OPERATOR WORKSTATION

TECHNOLOGICAL FIELD

Example embodiments of the present invention relate generally to a material handling system, and more particularly, to a workstation for delivering goods to an operator for handling.

BACKGROUND

Picking or workstations are essential components of high volume distribution and fulfillment operations. Conventionally, order picking requires an order picker to take an order list, walk through racks of products filled with containers of products to pick from, picking the listed products from product containers, and placing the picked products into an order container for delivery to packaging. However, this solution is slow and requires intensive manpower. Thus, automated picking or workstations are used in more recent systems.

Applicant has identified several technical challenges associated with order picking and other associated systems and methods. Through applied effort, ingenuity, and innovation, many of these identified challenges have been overcome by developing solutions that are included in embodiments of the present invention, many examples of which are described in detail herein.

SUMMARY

The following presents a simplified summary to provide a basic understanding of some aspects of the disclosed goods to operator workstation. This summary is not an extensive overview and is intended to neither identify key or critical elements nor delineate the scope of such elements. Its purpose is to present some concepts of the described features in a simplified form as a prelude to the more detailed description that is presented later.

The illustrative embodiments of the present disclosure relate to systems and methods for handling goods in a material handling environment. According to at least one aspect of the present disclosure, a goods to operator workstation for presenting a container of articles to an operator for picking is provided. The goods to operator workstation may receive the container from an infeed conveyor and may release picked container onto a discharge conveyor of a material handling system. The goods to operator workstation may include a container presenting mechanism for receiving and presenting the container to the operator. The container presenting mechanism may include at least two laterally movable arms positioned at a first predetermined distance from each other to create a first space to receive the container. The goods to operator workstation may further include a lifting unit, communicably coupled to and positioned below the container presenting mechanism. In accordance with the disclosed embodiment, the lifting unit may move vertically upwards into the first space to receive the container from the at least two laterally movable arms. In response, the at least two laterally movable arms may move outwardly away from each other to be positioned at a second predetermined distance from each other to create a second space for the lifting unit to pass the container vertically downwards between the laterally movable arms.

According to one or more embodiments of the present disclosure, each of the at least two laterally movable arms may include a strip belt for conveying the container towards the operator.

According to one or more embodiments of the present disclosure, the container presenting mechanism may further include a strip belt drive coupled to a drive shaft attached to the at least two laterally movable arms, such that the strip belt drive rotates the drive shaft and drives the strip belts forward.

According to one or more embodiments of the present disclosure, the goods to operator workstation may further include an infeed conveyor portion, positioned between the infeed conveyor and the container presenting mechanism, for receiving the container from the infeed conveyor, and a discharge conveyor portion, positioned between the lifting unit and the discharge conveyor, for releasing the picked container onto the discharge conveyor.

According to one or more embodiments of the present disclosure, the container presenting mechanism may be inclined at an angle with respect to the infeed conveyor portion of the goods to operator workstation.

According to one or more embodiments of the present disclosure, the container presenting mechanism may include a translational mechanism coupled to the at least two laterally movable arms for moving the at least two laterally movable arms towards and away from each other.

According to one or more embodiments of the present disclosure, the translational mechanism may be a lead screw drive having a lead screw disposed between the at least two laterally movable arms, and a motor coupled to the lead screw for rotating the lead screw in a first direction to move the at least two laterally movable arms away from each other and rotating the lead screw in a second direction to move the at least two laterally movable arms towards each other.

According to one or more embodiments of the present disclosure, the first predetermined distance and the second predetermined distance may be determined based on a contour of the container supported on the at least two laterally movable arms.

According to one or more embodiments of the present disclosure, the at least two laterally movable arms are actuated to move inwardly towards each other from the second predetermined distance to the first predetermined distance to receive a next container from the infeed conveyor portion.

According to one or more embodiments of the present disclosure, the infeed conveyor portion and/or the discharge conveyor portion may include a belted conveyor, a roller conveyor, and/or a combination thereof.

According to one or more embodiments of the present disclosure, the first space created by the positioning of the at least two laterally movable arms at the first predetermined distance may be greater than or equal to a width of the lifting unit to facilitate the lifting unit to lift the container from the at least two laterally movable arms to an elevated position.

According to one or more embodiments of the present disclosure, the second space may provide clearance to lower the lifting unit and the container from the elevated position towards the discharge conveyor.

According to one or more embodiments of the present disclosure, the lifting unit may include one or more lift arms for receiving the container from the container presenting mechanism, and a vertically reciprocating lift mechanism, coupled to the one or more lift arms, for moving the one or more lift arms vertically upwards and downwards.

According to one or more embodiments of the present disclosure, the lifting unit may include at least two lift arms disposed on either side of a discharge conveyor portion of the goods to operator workstation, wherein the at least two lift arms may move downwards to transfer the container to the discharge conveyor portion. Further, the at least two lift arms may be inclined at an angle with respect to the discharge conveyor portion.

According to one or more embodiments of the present disclosure, the goods to operator workstation may further include at least one hard stop to control an advancement of the container on the at least two laterally movable arms. The hard stop may be provided at one end of the container presenting mechanism where the operator intends to perform the pickup operation.

According to another aspect of the present disclosure, a method of operating a goods to operator workstation for presenting a container of articles to an operator for picking, is provided. The goods to operator workstation may receive the container from an infeed conveyor and may release picked container onto a discharge conveyor. The method may include receiving the container by a container presenting mechanism having at least two laterally movable arms positioned at a first predetermined distance from each other to create a first space for receiving the container and presenting the container to the operator for picking. The method may further include operating a lifting unit, communicably coupled to and positioned below the container presenting mechanism, to receive the container from the at least two laterally movable arms, moving the at least two laterally movable arms outwardly away from each other to be positioned at a second predetermined distance from each other to create a second space, and operating the lifting unit to lower the container passing through the second space towards the discharge conveyor.

According to one or more embodiments of the present disclosure, the method may further include moving the at least two laterally movable arms inwardly towards each other from the second predetermined distance to the first predetermined distance to receive a next container from the infeed conveyor.

According to another aspect of the present disclosure, a system for presenting a container of articles to an operator for picking is provided. The system may include a goods to operator workstation for receiving the container from an infeed conveyor and releasing picked container onto a discharge conveyor, and a control unit communicatively coupled to the goods to operator workstation. The control unit may include a processor configured with processor-executable instructions to perform operations comprising moving the container from the infeed conveyor to a container presenting mechanism of the goods to operator workstation, the container presenting mechanism may include at least two laterally movable arms positioned at a first predetermined distance from each other to create a first space for receiving the container, operating a lifting unit, communicably coupled to and positioned below the container presenting mechanism, to receive the container from the at least two laterally movable arms, moving the at least two laterally movable arms outwardly away from each other to be positioned at a second predetermined distance from each other to create a second space, and operating the lifting unit to lower the container passing through the second space towards the discharge conveyor.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

As described above, in earlier systems order picking required an order picker to take an order list, walk through racks of products filled with containers of products to pick from, picking the listed products from product containers, and placing the picked products into an order container for delivery to packaging. Automating the picking process can reduce time, manpower, and costs. An automated system can bring the product containers to the picker for picking, return the product containers to storage, and deliver the filled orders to packing and shipping.

The goods to operator workstation described herein, in accordance with one or more embodiments of the present disclosure, may be attachable or be positioned next to an infeed and a discharge conveyor of a material handling system for automatically presenting infeed containers to an operator for goods handling and for automatically taking away handled container to the discharge conveyor. Thus, the goods and/or the containers are easily accessible to the operator at an order picking position without the need for the operator to walk through the aisles or to manually move containers on the conveyors.

Figure 1:
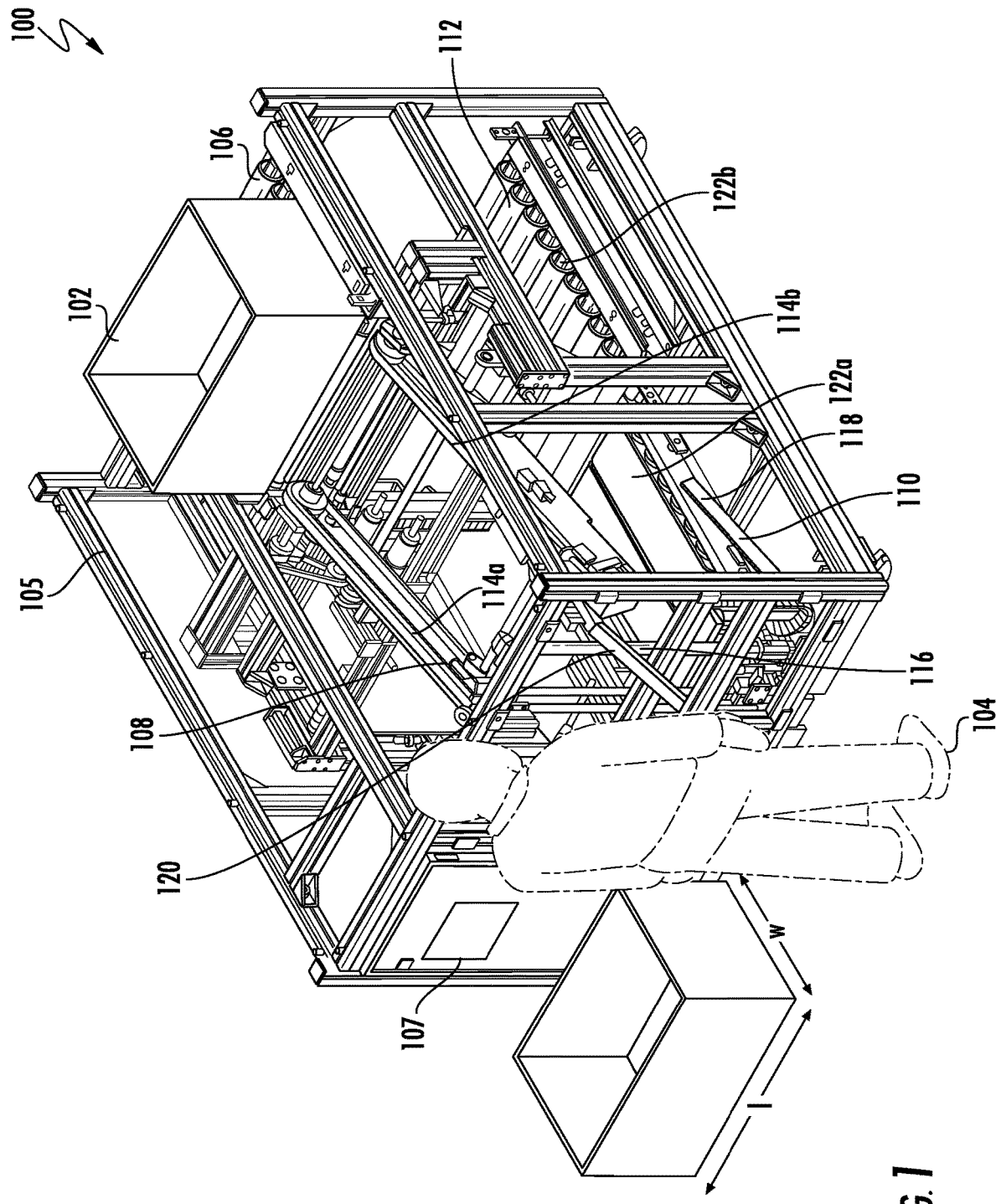
FIG. 1 illustrates a perspective view of a goods to operator workstation in accordance with an embodiment of the present disclosure.

FIG. 1 illustrates a perspective view of a goods to operator workstation 100, in accordance with one or more embodiments of the present disclosure. The goods to operator workstation 100 may be attachable to or located adjacent to an infeed conveyor (not shown) and/or a takeaway or a discharge conveyor (not shown) of a material handling system, such that the goods to operator workstation 100 may receive one or more totes and/or containers directly from the infeed conveyor having a queue of totes and/or container to be handled by an operator. Once a container is received by the goods to operator workstation 100, the container may be presented to an operator for picking goods from the container and/or placing items into the container. The container is then automatically discharged onto the takeaway conveyor by the goods to operator workstation 100.

In accordance with an embodiment of the present disclosure, the goods to operator workstation 100 presents a container 102 to an operator 104 for handling, as shown in FIG. 1. The goods to operator workstation 100 includes a frame 105 having an infeed conveyor portion 106 positioned adjacent or next to an infeed conveyor (not shown) of the material handling system. In other embodiments, the infeed conveyor portion 106 may receive containers directly from a worker and/or a robotic tool, instead of an infeed conveyor. The infeed conveyor portion 106 may include a belted conveyor section, a roller conveyor section, and/or a combination thereof. The infeed conveyor portion 106 may act as a staging conveyor that receives the container 102 from the infeed conveyor (not shown) and conveys the container 102 towards a container presenting mechanism 108 of the goods to operator workstation 100.

The container presenting mechanism 108 is positioned downstream of the infeed conveyor portion 106. The container presenting mechanism 108 presents the container 102 to the operator 104 in an order picking position, such that the operator 104 may easily access the container to pick and/or place goods within the container 102. In accordance with the embodiments of the present disclosure, the container presenting mechanism 108 includes two laterally movable arms 114a and 114b for conveying the container 102 from the infeed conveyor portion 106 to the operator 104.

As shown in FIG. 1, the container presenting mechanism 108 includes two laterally movable arms 114a and 114b spaced apart from each other and inclined at an angle relative to the infeed conveyor portion 106. The two laterally movable arms 114a and 114b are inclined to present the container 102 at an optimal angle to the operator 104, so that the operator 104 may easily look at and/or access the contents of the container 102 in spite of the height of the goods to operator workstation 100.

The goods to operator workstation 100 further includes a lifting unit 110 communicably coupled to and positioned below the container presenting mechanism 108. The lifting unit 110 may include one or more lift arms 118, 120 coupled to a vertically reciprocating lift mechanism 116, and inclined at an angle corresponding to an angle of incline of the laterally movable arms 114a and 114b. The vertically reciprocating lift mechanism 116 moves the lift arms 118, 120 upwards and downwards along the frame 105 of the goods to operator workstation 100.

Once the container 102 is handled by the operator 104, the lifting unit 110 receives the container 102 from the container presenting mechanism 108. The lifting unit 110 discharges the container 102 onto a discharge conveyor portion 112 located downstream of the container presenting mechanism 108. The discharge conveyor portion may include a belted conveyor section, a roller conveyor section, and/or a combination thereof. The discharge conveyor portion 112 may be a combination of a first discharge conveyor portion 122a and a second discharge conveyor portion 122b, as shown in FIG. 1. The first discharge conveyor portion 122a may be located between or under the lift arms 118, 120, such that the first discharge conveyor portion 122a receives the container 102 from the lifting unit 110. The first discharge conveyor portion 122a moves the container 102 to the second discharge conveyor portion 122b for discharging the container 102 to a take away and/or a discharge conveyor (not shown) of the material handling system. In another embodiment, a worker and/or a robotic tool may pick the container 102 from the second discharge conveyor portion 122b, once the container 102 is handled by the operator 104.

The goods to operator workstation 100 may further include a control unit 107, as shown in FIG. 1. The control unit 107 may include suitable logic and/or circuitry that may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. The control unit 107 may include a plurality of processors and signal processing modules. The plurality of processors may be embodied on a single electronic device or may be distributed across a plurality of electronic devices collectively configured to function as the circuitry of the control unit 107. The plurality of processors may be in operative communication with each other and may be collectively configured to perform one or more functionalities of the circuitry of the control unit 107, as described herein. In an example embodiment, the control unit 107 may be configured to execute instructions stored in a memory device or otherwise accessible to the control unit 107. These instructions, when executed by the control unit 107, may cause the circuitry of the control unit 107 to perform one or more of the functionalities, as described herein.

In various embodiments, the control unit 107 may be configured to control the movement of various subassemblies and components of the goods to operator workstation 100, as will be described later.

Figure 2A:
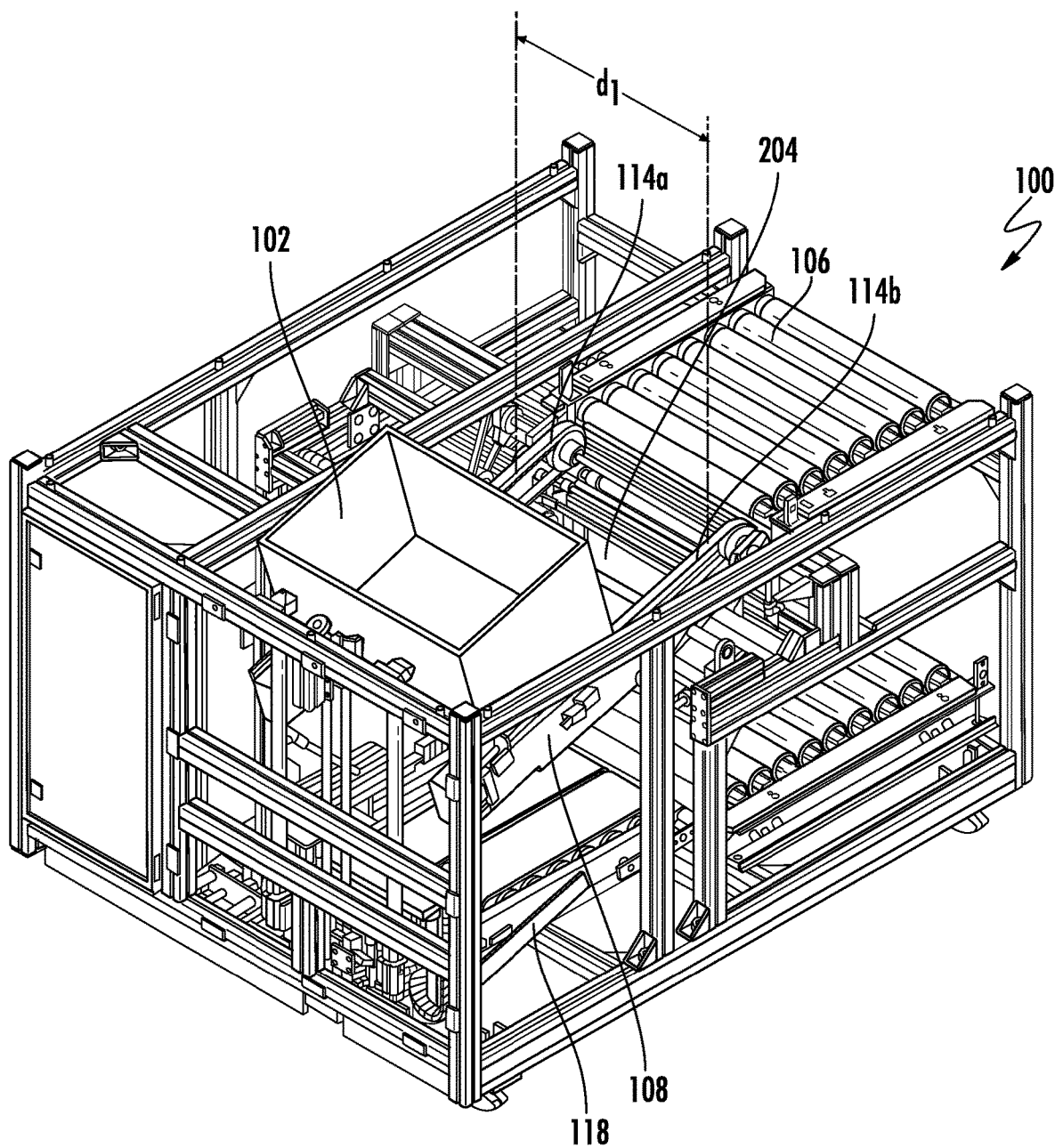
FIGS. 2A-2C illustrate perspective views of the goods to operator workstation in accordance with one or more embodiment of the present disclosure.
Figure 2B:
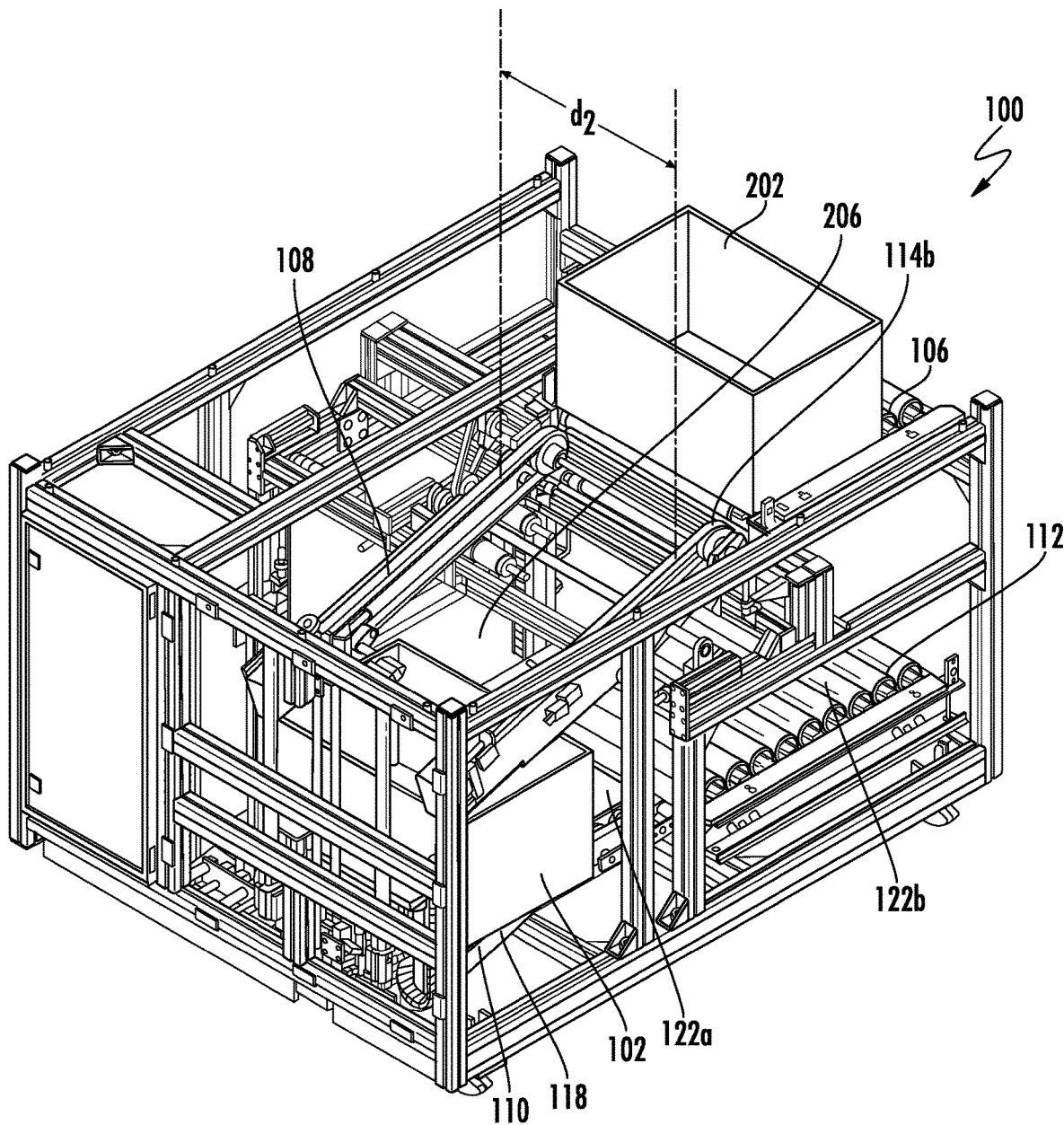
Figure 2C:
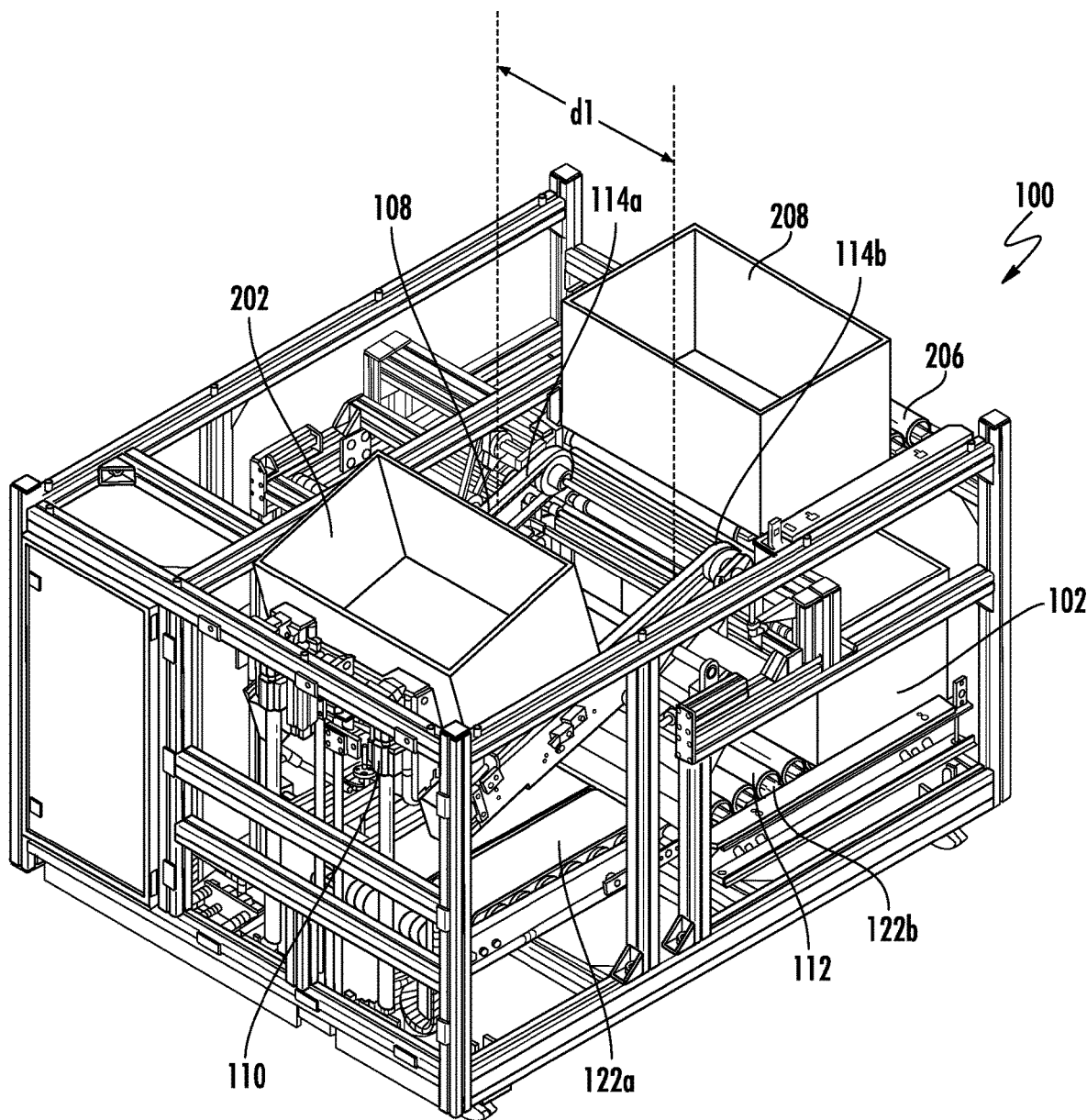

FIGS. 2A-2C illustrate perspective views of the goods to operator workstation 100 at different time intervals while conveying the container 102, in accordance with one or more embodiments of the present disclosure. FIG. 2A shows the container 102 placed at a handling or an order picking position on the goods to operator workstation 100. As described above, the container presenting mechanism 108 receives the container 102 from the infeed conveyor portion 106. Specifically, the laterally movable arms 114a and 114b contact a bottom of the container 102 and drive the container 102 forward along the laterally movable arms 114a and 114b towards an end of the container presenting mechanism 108.

Further, in accordance with one or more embodiment, for receiving the container 102 from the infeed conveyor portion 106, the two laterally movable arms 114a and 114b may be positioned at a first predetermined distance d1 from each other, creating a first space 204 between the two laterally movable arms 114a and 114b. The first predetermined distance d1 may be pre-programmed in a control unit associated with the goods to operator workstation 100, and/or may be determined dynamically by the goods to operator workstation 100 based on one or more parameters of the container, such as, shape, size, type, contour, and the like. For example, the goods to operator workstation 100 may include and/or be in communication with one or more sensors, dimensioning systems, vision systems, and the like, for determining certain parameters, such as, but not limited to, a length, width, height, weight, shape, contour, and/or type of the container 102.

Based on the determined parameters, in some examples the goods to operator workstation 100 may determine an optimal spacing required between the two laterally movable arms 114a and 114b to be able to receive and convey the container 102 from the infeed conveyor portion 106 towards an operator. The optimal spacing between the two laterally movable arms 114a and 114b may be calculated based on one or more of a length, center of gravity, shape, and the like, of the container 102. Thus, the goods to operator workstation 100 may determine the first predetermined distance d1 required between the two laterally movable arms 114a and 114b corresponding to the optimal spacing.

In an example embodiment, the first space 204 may be greater than or equal to a width of the lifting unit 110 to facilitate the lifting unit 110 to pass through between the two laterally movable arms 114a and 114b. The laterally movable arms 114a and 114b may be moved laterally towards and/or away from each other to place the two laterally movable arms 114a and 114b at the first predetermined distance d1 from each other. In some embodiments, the totes and/or the container to be handled by the goods to operator workstation 100 may be fixed in size and/or shape, and therefore, the first predetermined distance d1 may be pre-programmed to the goods to operator workstation 100.

Further, as shown in FIG. 2A, the laterally movable arms 114a and 114b may be inclined at an angle with respect to the infeed conveyor portion 106. The angle of incline of the laterally movable arms 114a and 114b may be fixed and/or may be dynamically determined based on one or more parameters of the container 102, such as, but not limited to, height, shape, contour, weight, type of items within the container, and the like. As described above, the laterally movable arms 114a and 114b may be inclined to present the container 102 at an angled position to the operator, so that the operator may easily view and access the contents of the container 102.

In an example embodiment, the angle of incline of the laterally movable arms 114a and 114b may depend on a height of the operator, and/or may be set and/or modified by each operator of the goods to operator workstation 100 as per his/her preference. It should be noted that in certain embodiments, the laterally movable arms 114a and 114b may not be inclined with respect to the infeed conveyor portion 106. For example, if a height of the goods to operator workstation 100 is less than a threshold, such that an operator may easily access the items within the container 102 from above, the container presenting mechanism 108 may present the container 102 to the operator as received from the infeed conveyor portion 106, without inclining the container 102.

Once the container presenting mechanism 108 presents the container 102 at an order picking and/or handling position to the operator, the operator may pick and/or place goods within the container 102 based on an order and/or task list. Further, when the goods within the container 102 are handled, the container 102 may be ready to be discharged onto a take away conveyor (not shown). In this regard, the operator may initiate the transfer of the container 102 from the container presenting mechanism 108 to a discharge conveyor. For example, the operator may press a button (not shown) on the goods to operator workstation 100 for lowering the container 102 from the order picking and/or handling position. In another embodiment, a goods handling time may be fixed and the container 102 may be automatically transferred from the container presenting mechanism 108 to a discharge conveyor after the expiration of the goods handling time. In another embodiment, the transfer of the container 102 from the container presenting mechanism 108 may be initiated in response to determining that the operator has picked and/or placed goods in the container 102.

FIG. 2B shows the container 102 being transferred from the container presenting mechanism 108 onto the discharge conveyor portion 112 by the lifting unit 110, in accordance with one or more embodiments of the present disclosure. As described above, once the container 102 and/or the goods within the container 102 are handled by the operator, the lifting unit 110 having the lift arms 118 moves vertically upwards within the first space created between the two laterally movable arms 114a and 114b, to elevate the container 102 from the two laterally movable arms 114a and 114b, so that the laterally movable arms 114a and 114b are no longer in contact with the container 102. In response, the container presenting mechanism 108 moves the two laterally movable arms 114a and 114b outwardly away from each other to be positioned at a second predetermined distance d2 from each other, as shown in FIG. 2B. Thus, the two laterally movable arms 114a and 114b create a second space 206 between the two laterally movable arms 114a and 114b Similar to the first predetermined distance d1, as described above, the second predetermine distance d2 may be fixed and/or dynamically determined by the goods to operator workstation 100. In an embodiment, the second predetermine distance d2 and/or the second space 206 may correspond to a contour of the container 102. For example, if the length and/or the width of the container 102 is identified to be x units, the second predetermined distance d2 may be determined to be greater than x units, so that the lifting unit 110 containing the container 102 may pass downwards through the second space 206 without hindrance from the two laterally movable arms 114a and 114b.

Thus, once the two laterally movable arms 114a and 114b move outwardly away from each other to be positioned at the second predetermined distance d2 from each other creating the second space 206, the lifting unit 110 holding the container 102 lowers through the second space 206 towards the first discharge conveyor portion 122a, as shown in FIG. 2B. Thus, the second space 206 may be indicative of a gap required to lower the lifting unit 110 and the container 102 from an elevated position towards the discharge conveyor portion 112. Further, while the container 102 is being transferred from the container presenting mechanism 108 onto the discharge conveyor portion 112, a next container 202 may be received by the infeed conveyor portion 106, as shown.

FIG. 2C shows the container 102 being discharged off the goods to operator workstation 100 while the next container 202 is being handled by the operator, in accordance with one or more embodiments of the present disclosure. As described with reference to FIG. 2B, the lifting unit 110 lowers the container 102 from the container presenting mechanism 108 onto a first discharge conveyor portion 122a. Specifically, the two lift arms 118, 120 are located on either side of the first discharge conveyor portion 122a such that when the lift arms carrying the container 102 move vertically downwards, the container 102 is placed on the first discharge conveyor portion 122a by the lifting unit 110. The first discharge conveyor portion 122a may have a belted conveyor, such that the container 102 may be conveyed forward onto the second discharge conveyor portion 122b, as shown in FIG. 2C. The second discharge conveyor portion 122b may be positioned adjacent to a takeaway and/or a discharge conveyor of the material handling system. Thus, the container 102 may be conveyed off the goods to operator workstation 100 and onto a takeaway conveyor by the second discharge conveyor portion 122b. FIG. 2C further shows the goods to operator workstation 100 having the next container 202 in the order picking and/or handling position on the container presenting mechanism 108. In accordance with an embodiment of the present disclosure, in response to determining that the lifting unit 110 carrying the container 102 has passed through the two laterally movable arms 114a and 114b, the container presenting mechanism moves the two laterally movable arms 114a and 114b towards each other to reposition the two laterally movable arms 114a and 114b at a third predetermined distance from each other. Further, the third predetermined distance may be same as the first predetermined distance d1 and/or may be determined dynamically with respect to each individual container. Thus, the container presenting mechanism 108 receives the next container 202 from the infeed conveyor portion 106, and positions the container 202 at an order picking and/or handling position, as shown in FIG. 2C. Further, a third container 208 may be received by the infeed conveyor portion 106 from an infeed conveyor (not shown).

Figure 3:
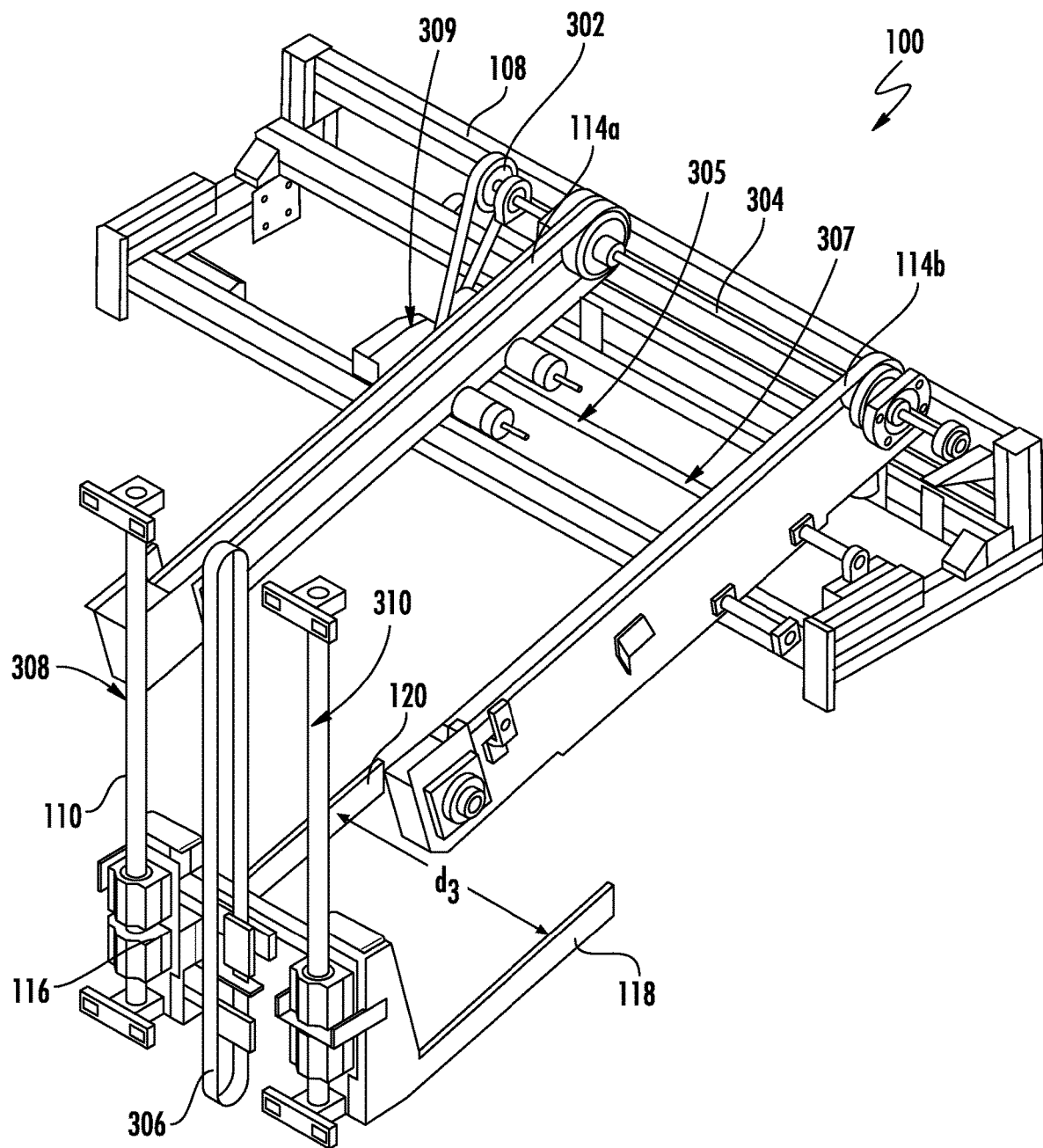
FIG. 3 illustrates a perspective view of a lifting unit and a container presenting mechanism of the goods to operator workstation in accordance with one or more embodiments of the present disclosure.

FIG. 3 illustrates a perspective view of the lifting unit 110 and the container presenting mechanism 108 of the goods to operator workstation 100, in accordance with one or more embodiments of the present disclosure. In an example embodiment, the container presenting mechanism 108 includes laterally movable and spaced apart laterally movable arms 114a and 114b. The laterally movable arms 114a and 114b may include strip belts or any other linear transfer mechanism for moving the container towards the operator. In an embodiment, the container presenting mechanism 108 includes a strip belt drive 302 coupled to a drive shaft 304 attached to the laterally movable arms 114a and 114b.

In an example embodiment, the laterally movable arms 114a and 114b may be pivotally coupled to the drive shaft 304 to adjust the angle of incline of the laterally movable arms 114a and 114b. Further, each strip belt may be wrapped around laterally movable arms 114a and 114b, as shown in FIG. 3. The strip belt drive 302 may include a motor for rotating the drive shaft 304, such that the rotation of the drive shaft drives the strip belts of the laterally movable arms 114a and 114b. Further, the drive shaft 304 may rotate in a first direction to move the strip belts towards the operator and rotate in an opposite direction to move the strip belt away from the operator. Thus, the laterally movable arms 114a and 114b may convey the container towards and/or away from the operator, as needed.

The laterally movable arms 114a and 114b may further be coupled to a translational mechanism that enables the laterally movable arms 114a and 114b to move laterally towards and/or away from each other. In an embodiment, the translation means includes a lead screw drive 305. The lead screw drive 305 may have a lead screw 307 disposed between the two laterally movable arms 114a and 114b. The lead screw 307 may have a spiral thread throughout the length of the lead screw 307. The lead screw 307 may be connected to a drive 309, such as a motor, at one end of the lead screw 307. The drive 309 may rotate the lead screw 307 when activated. The rotational motion of the lead screw 307 translates into a lateral motion of the two laterally movable arms 114a and 114b. That is, the drive 309 may rotate in a first direction to widen the space between the two laterally movable arms 114a and 114b and may rotate in a second direction to retract the two laterally movable arms 114a and 114b towards each other. The drive 309 may be communicably coupled to the control unit of the goods to operator workstation 100 for controlling the movement of the laterally movable arms 114a and 114b. Alternatively or additionally, any translational mechanism for moving the laterally movable arms 114a and 114b laterally towards and/or away from each other, may be used.

Further, as described above, the lifting unit 110 includes the vertically reciprocating lift mechanism 116 coupled to a lift belt 306 and lift arms 118, 120. The vertically reciprocating lift mechanism 116 may be coupled to the frame of the goods to operator workstation 100 through support rods 308, 310. In an embodiment, the lift belt 306 may be controlled by a control unit of the goods to operator workstation 100 to drive the vertically reciprocating lift mechanism 116 coupled to the lift arms 118, 120 vertically upwards and downwards along the support rods 308, 310. Thus, the lift arms 118, 120 may be moved upwards to elevate a container from the laterally movable arms 114a and 114b, and may be moved downwards to transfer the container onto the discharge conveyor portion. It should be noted that the structure of the lifting unit 110 describe above is for exemplary purpose, and the present disclosure is not limited to the described structure. Alternatively or additionally any vertically reciprocating means for moving the lift arms 118, 120 vertically upwards and downwards relative to the frame, may be used.

Figure 4:
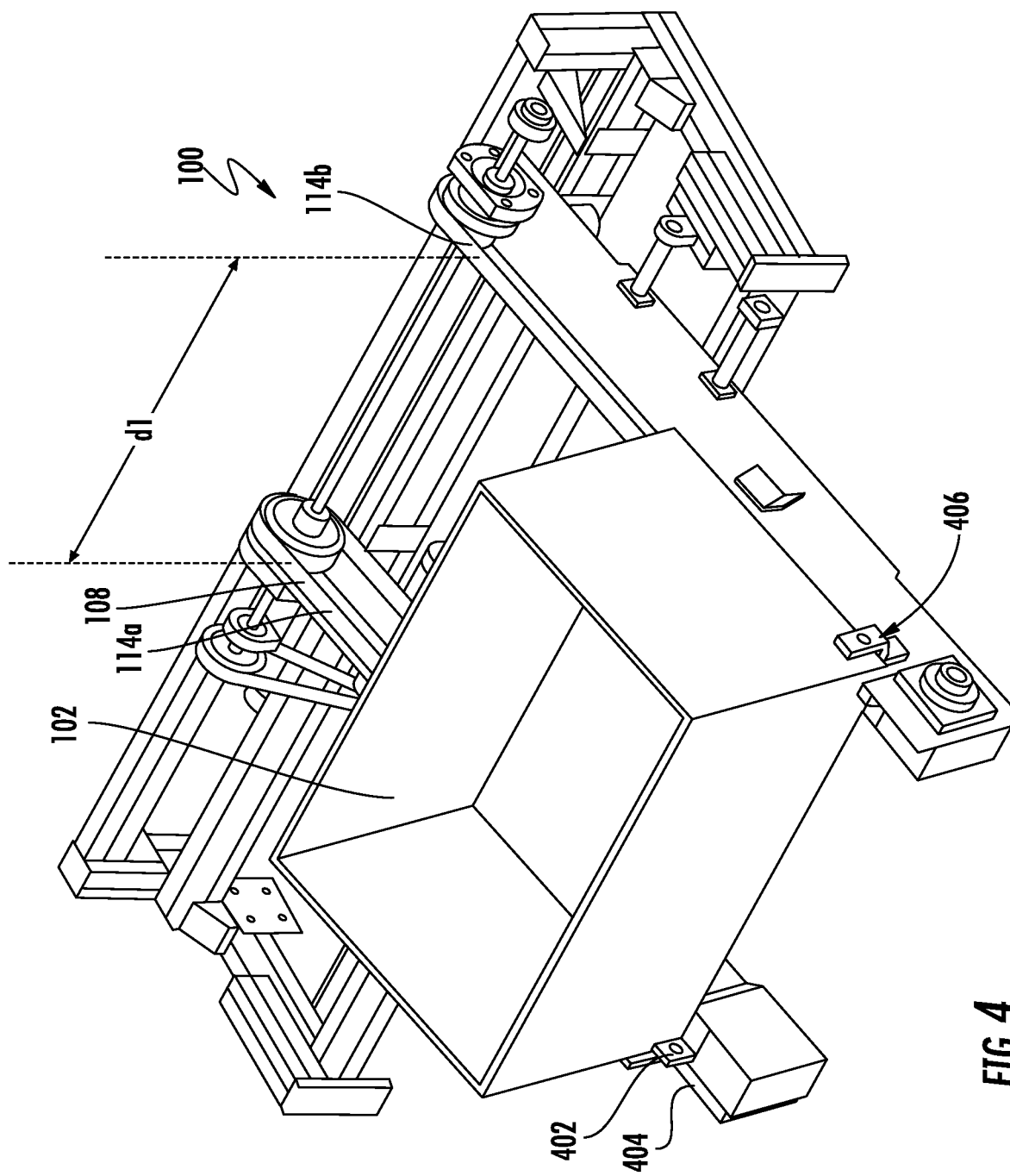
FIG. 4 illustrates a perspective view of the container presenting mechanism carrying a container in accordance with one or more embodiments of the present disclosure.

FIG. 4 illustrates a perspective view of the container presenting mechanism 108 carrying a container 102, in accordance with one or more embodiments of the present disclosure. As described above, the translational mechanism of the container presenting mechanism 108 may position the laterally movable arms 114a and 114b at the first predetermined distance d1 from each other, as shown in FIG. 4. The container 102 is positioned at an order picking and/or handling position on the laterally movable arms 114a and 114b. The container presenting mechanism 108 may further include one or more hard stops 402 located at distal end 404 of the laterally movable arms 114a and 114b. The container 102 when moved towards the operator by the laterally movable arms 114a and 114b, may abut and/or rest against the hard stop 402, thus, preventing a further motion and/or a fall of the container 102 from the goods to operator workstation 100. The laterally movable arms 114a and 114b may further include side bars 406 for aligning the container 102 onto the laterally movable arms 114a and 114b and to prevent a side fall of the container 102 off the laterally movable arms 114a and 114b. As shown, the side bar 406 may be a bracket and/or a bar located on outer walls and extending above the laterally movable arms 114a and 114b.

Figure 5A:
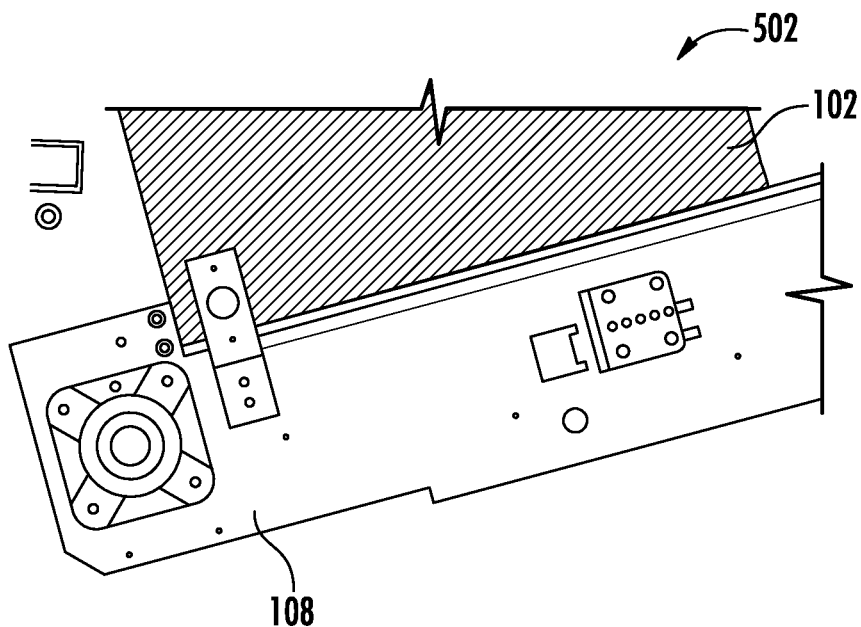
FIGS. 5A-5C illustrate different side views of the container presenting mechanism in accordance with one or more embodiment of the present disclosure.
Figure 5B:
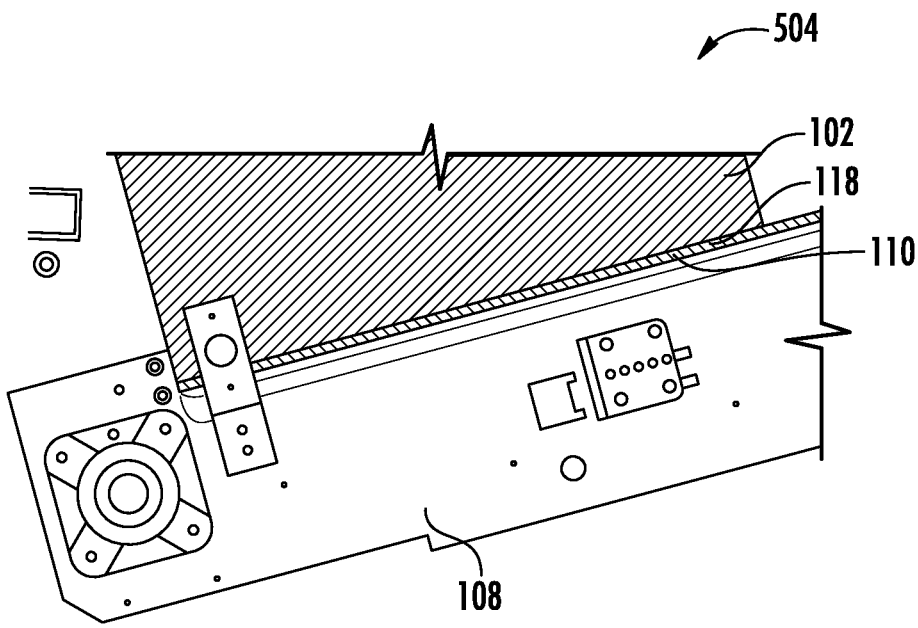
Figure 5C:
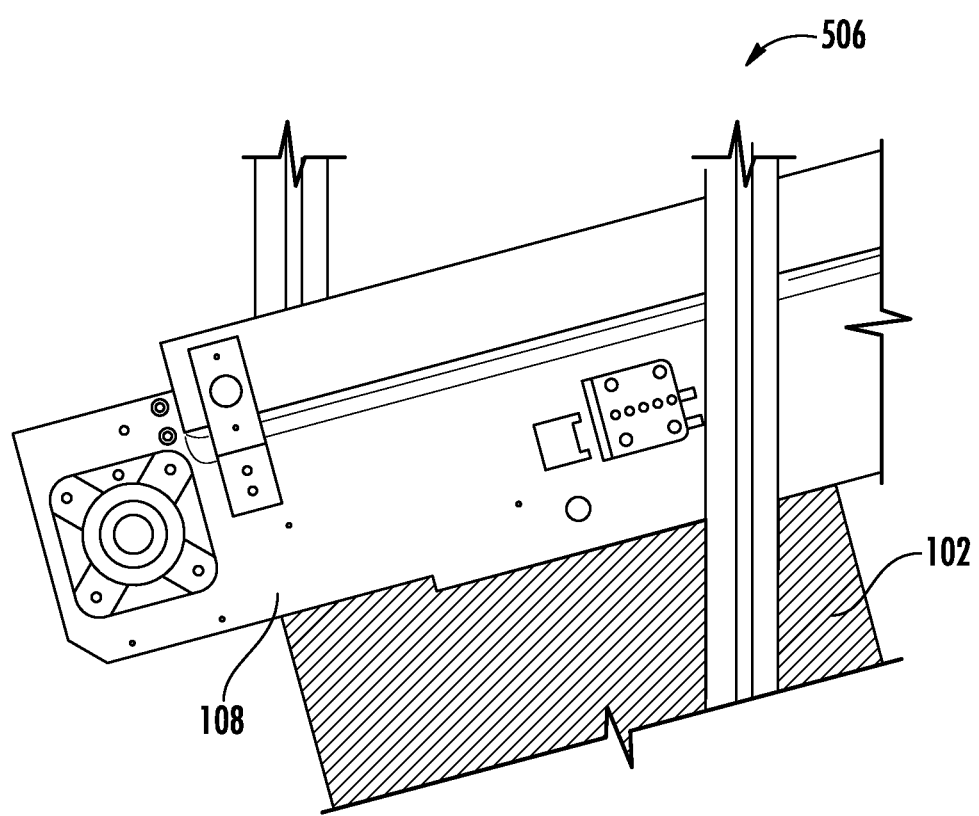

FIGS. 5A-5C illustrate different side views of the container presenting mechanism 108, in accordance with one or more embodiment of the present disclosure. FIG. 5A shows a view of the container presenting mechanism 108 holding the container 102 in accordance with a scenario 502. As can be seen in FIG. 5A, the container 102 rests on the laterally movable arms and against the hard stop. The laterally movable arms are positioned at the first predetermined distance from each other, creating the first space between the laterally movable arms. FIG. 5B shows a view of the lifting unit 110 elevating the container 102 from the container presenting mechanism 108, in accordance with a scenario 504, after a period of time from scenario 502. For moving the container 102 from the container presenting mechanism 108 to a discharge conveyor, the lift arm 118 of the lifting unit 110 pass through the first space created between the laterally movable arms, contact the container 102 from below, and elevate the container 102 from the laterally movable arms, as shown in FIG. 5B. Once the container 102 is lifted from the laterally movable arms, the container presenting mechanism 108 may move the laterally movable arms outwardly away from each other to be positioned at the second predetermined distance from each other, creating the second space, such as second space 206 in FIG. 2, between the laterally movable arms. FIG. 5C shows a view of the container 102 moving downwards through the container presenting mechanism 108, in accordance with a scenario 506, after a period of time from scenario 504. Once the laterally movable arms are positioned at the second predetermined distance from each other, the lift arms carrying the container 102 are moved vertically downwards through the second space between the laterally movable arms towards the discharge conveyor portion (not shown) of the goods to operator workstation. Further, in response to determining that the container 102 has passed through the laterally movable arms, the laterally movable arms may be moved towards each other to reposition the laterally movable arms at the first predetermined distance from each other (not shown).

Figure 6:
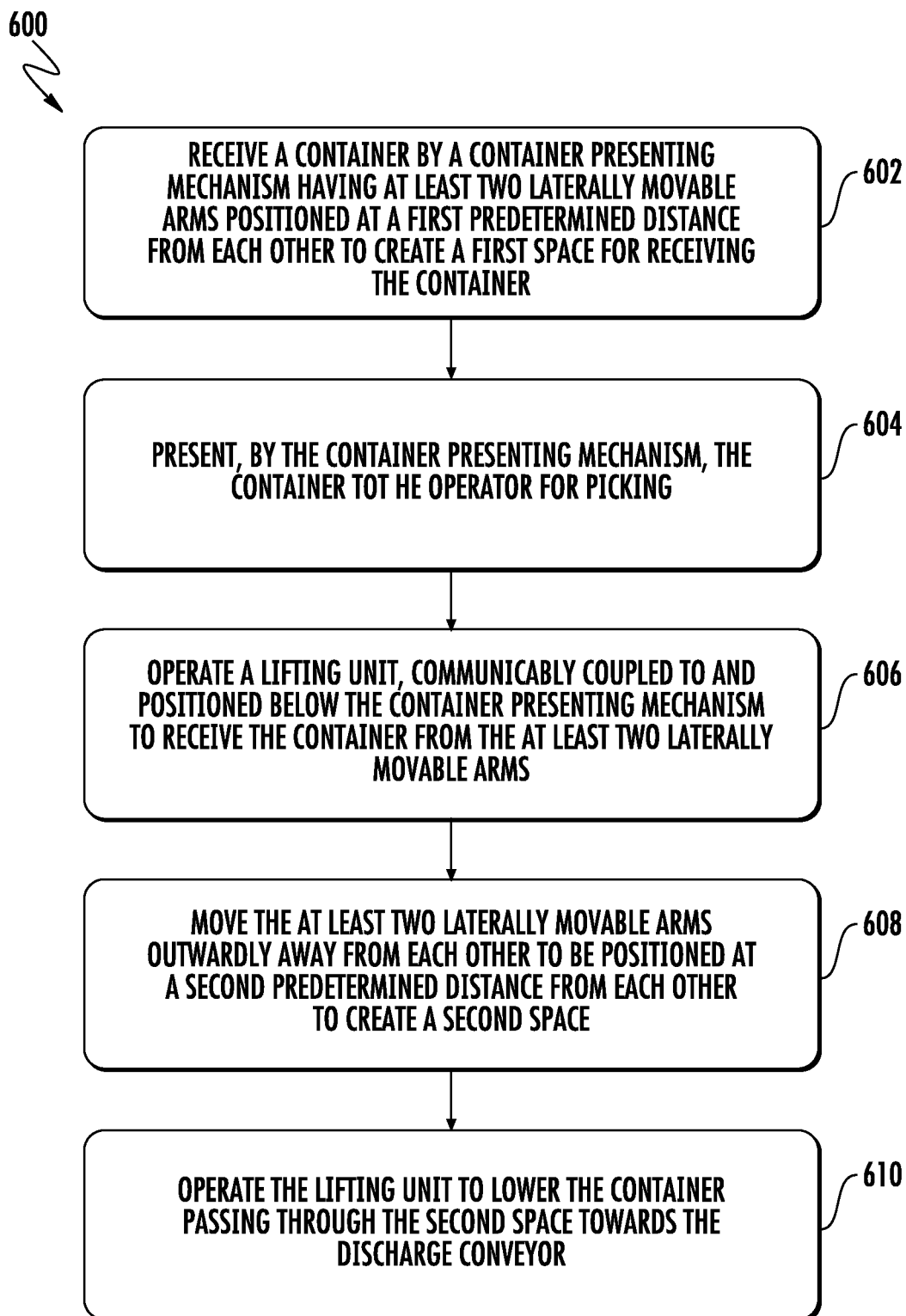
FIG. 6 illustrates an example method for operating a goods to operator workstation, in accordance with one or more embodiments of the present disclosure.

FIG. 6 illustrates an example method 600 for operating the goods to operator workstation 100, in accordance with one or more embodiments of the present disclosure. The method 600 may include receiving a container 102 by the container presenting mechanism 108 comprising at least two laterally movable arms 114a and 114b positioned at a first predetermined distance d1 from each other to create a first space for receiving the container 102, as shown in FIGS. 1 and 2A-2C, at block 602. The container presenting mechanism 108 may have two laterally movable arms 114a and 114b positioned at the first predetermined distance d1 from each other, creating the first space between the laterally movable arms 114a and 114b. In an embodiment, a control unit and/or a processor associated with the goods to operator workstation 100 control the lateral movement of the laterally movable arms 114a and 114b by controlling a motor associated with the translational mechanism, as described above. Further, the first predetermined distance d1 may be pre-programmed in the control unit associated with the goods to operator workstation 100, and/or may be determined dynamically by the goods to operator workstation 100 and/or the control unit based on one or more parameters of the container 102, such as, but not limited to, a length, width, contour, height, weight, shape, and/or type of the container 102. Based on the determined parameters, the goods to operator workstation 100 may determine an optimal spacing required between the two laterally movable arms 114a and 114b to be able to receive and convey the container 102 from the infeed conveyor portion 106 towards an operator. The goods to operator workstation 100 and/or the control unit may determine the first predetermined distance d1 required between the two laterally movable arms 114a and 114b based on the optimal spacing. The laterally movable arms 114a and 114b may be moved laterally towards and/or away from each other to place the two laterally movable arms 114a and 114b at the first predetermined distance d1 from each other.

The method may further include presenting, by the container presenting mechanism 108, the container 102 to the operator 104 for picking, at block 604. The operator 104 may perform an operation, such as item picking and/or placing, on the container 102 positioned on the container presenting mechanism 108.

The method 600 may further include operating a lifting unit 110, communicably coupled to and positioned below the container presenting mechanism 108, to receive the container 102 from the at least two laterally movable arms 114a and 114b, as shown in FIG. 2A-2C, at block 606. In an embodiment, the control unit 107 of the goods to operator workstation 100 may control the vertical reciprocating movement of the lifting unit 110. In this regard, upon detecting a condition for initiating the transfer of the container 102 from the container presenting mechanism 108, such as, determining that the operator has picked and/or placed goods within the container 102, the lifting unit 110 may be controllably moved upwards to contact and elevate the container 102 from the laterally movable arms 114a and 114b, as described above.

The method 600 may further include moving the at least two laterally movable arms 114a and 114b outwardly away from each other to be positioned at a second predetermined distance d2 from each other to create a second space, as shown in FIG. 2A-2C, at block 608. In response to determining that the container 102 has been lifted from the laterally movable arms 114a and 114b by the lifting unit 110, the control unit 107 and/or a processor associated with the goods to operator workstation 100 may control the motor associated with the translational mechanism of the container presenting mechanism 108 for moving the laterally movable arms 114a and 114b outwardly away from each other to be positioned at distance d2 from each other, creating the second space, as described above.

Further, the method 600 may include operating the lifting unit 110 to lower the container 102 passing through the second space towards the discharge conveyor portion 112, at block 610. As described above, the control unit 107 of the goods to operator workstation 100 may control the vertical reciprocating movement of the lifting unit 110 to move the lifting unit 110 carrying the container 102 downwards through the second space onto the discharge conveyor 112. Thus, automatically transferring the container 102 from the infeed conveyor portion 106 to an order picking and/or handling position, and further to a discharge conveyor portion 112 once the container 102 is handled. Optionally, the method 600 may further include repositioning the laterally movable arms 114a and 114b at a third predetermined distance from each other to recreate the first space for receiving a next container onto the container presenting mechanism 108 from the infeed conveyor portion 106. As described above, the third predetermined distance may be same as the first predetermined distance d1 and/or may be determined dynamically with respect to each individual container.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A goods to operator workstation, the goods to operator workstation comprising:
    a container presenting mechanism for receiving and presenting a container to an operator, wherein the container presenting mechanism comprises at least two laterally movable arms positioned at a first predetermined distance from each other and define a first space to receive the container; and
    a lifting unit, communicably coupled to and positioned below the container presenting mechanism,
    wherein the lifting unit is configured to move vertically upwards into the first space to receive the container from the at least two laterally movable arms, wherein the at least two laterally movable arms are actuated to move outwardly away from each other to be positioned at a second predetermined distance from each other and define a second space for the lifting unit to pass the container vertically downwardly between the at least two laterally movable arms.

2. The goods to operator workstation of claim 1, wherein each of the at least two laterally movable arms comprise a strip belt that is configured to convey the container towards the operator.

3. The goods to operator workstation of claim 2, wherein the container presenting mechanism further comprises a strip belt drive coupled to a drive shaft attached to the at least two laterally movable arms, wherein the strip belt drive rotates the drive shaft and drives the strip belt forward.

4. The goods to operator workstation of claim 1, further comprising:
    an infeed conveyor portion, positioned between an infeed conveyor and the container presenting mechanism, for receiving the container from the infeed conveyor;
    a discharge conveyor portion, positioned between the lifting unit and a discharge conveyor, for releasing the container onto the discharge conveyor.

5. The goods to operator workstation of claim 4, wherein the container presenting mechanism is inclined at an angle with respect to the infeed conveyor portion of the goods to operator workstation.

6. The goods to operator workstation of claim 1, wherein the container presenting mechanism comprises a translational mechanism coupled to the at least two laterally movable arms for moving the at least two laterally movable arms towards and away from each other.

7. The goods to operator workstation of claim 6, wherein the translational mechanism is a lead screw drive comprising:
    a lead screw disposed between the at least two laterally movable arms; and
    a motor coupled to the lead screw configured to:
        rotate the lead screw in a first direction to move the at least two laterally movable arms away from each other; and
        rotate the lead screw in a second direction to move the at least two laterally movable arms towards each other.

8. The goods to operator workstation of claim 1, wherein the first predetermined distance and the second predetermined distance is dynamically determined based on a contour of the container supported on the at least two laterally movable arms.

9. The goods to operator workstation of claim 1, wherein the at least two laterally movable arms are actuated to move inwardly towards each other from the second predetermined distance to a third predetermined distance to receive a next container from an infeed conveyor.

10. The goods to operator workstation of claim 4, wherein the infeed conveyor portion comprises a belted conveyor, a roller conveyor, or a combination thereof.

11. The goods to operator workstation of claim 4, wherein the discharge conveyor portion comprises a belted conveyor, a roller conveyor, or a combination thereof.

12. The goods to operator workstation of claim 1, wherein the first space created by the positioning of the at least two laterally movable arms at the first predetermined distance is greater than or equal to a width of the lifting unit to facilitate the lifting unit to lift the container from the at least two laterally movable arms to an elevated position.

13. The goods to operator workstation of claim 12, wherein the second space provides clearance to move the lifting unit and the container downwardly from the elevated position towards a discharge conveyor.

14. The goods to operator workstation of claim 1, wherein the lifting unit comprising:
   one or more lift arms configured to receive the container from the container presenting mechanism; and
   a vertically reciprocating lift mechanism, coupled to the one or more lift arms, configured to move the one or more lift arms vertically upwards and downwards.

15. The goods to operator workstation of claim 14, wherein the lifting unit comprises at least two lift arms disposed on either side of a discharge conveyor portion of the goods to operator workstation, wherein the at least two lift arms move downwards to transfer the container to the discharge conveyor portion.

16. The goods to operator workstation of claim 15, wherein the at least two lift arms are inclined at an angle with respect to the discharge conveyor portion.

17. The goods to operator workstation of claim 1, further comprises of at least one hard stop to control an advancement of the container on the at least two laterally movable arms, wherein the at least one hard stop is provided at one end of the container presenting mechanism where the operator intends to perform a pickup operation.

18. A material handling system for presenting a container to an operator, the system comprising:
   a goods to operator workstation for receiving the container from an infeed conveyor and releasing the container onto a discharge conveyor;
   a control unit communicatively coupled to the goods to operator workstation;
   a container presenting mechanism for receiving and presenting a container to an operator for picking in response to instructions from the control unit, wherein the container presenting mechanism comprises at least two laterally movable arms positioned at a first predetermined distance from each other and define a first space to receive the container; and
   a lifting unit, communicably coupled to and positioned below the container presenting mechanism,
   wherein the lifting unit is configured to move vertically upwards into the first space in response to instructions from the control unit to receive the container from the at least two laterally movable arms, wherein the at least two laterally movable arms are actuated to move outwardly away from each other in response to instructions from the control unit to be positioned at a second predetermined distance from each other and define a second space for the lifting unit to pass the container between the at least two laterally movable arms towards the discharge conveyor.

19. The material handling system of claim 18, wherein the at least two laterally movable arms are moved inwardly towards each other from the second predetermined distance to the first predetermined distance to receive a next container from the infeed conveyor.

20. The material handling system of claim 18, wherein each of the at least two laterally movable arms comprise a strip belt that is configured to convey the container towards the operator.

* * * * *